(12) United States Patent
Candelore et al.

(10) Patent No.: US 7,151,833 B2
(45) Date of Patent: Dec. 19, 2006

(54) SELECTIVE ENCRYPTION TO ENABLE TRICK PLAY

(75) Inventors: Brant L. Candelore, Escondido, CA (US); Tom Poslinski, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 763 days.

(21) Appl. No.: 10/391,940

(22) Filed: Mar. 19, 2003

(65) Prior Publication Data

US 2004/0049691 A1    Mar. 11, 2004

Related U.S. Application Data

(63) Continuation of application No. 10/319,096, filed on Dec. 13, 2002.

(60) Provisional application No. 60/409,675, filed on Sep. 9, 2002.

(51) Int. Cl.
*H04N 7/167* (2006.01)

(52) U.S. Cl. ............... 380/217; 380/201; 380/210; 380/239

(58) Field of Classification Search ............... None
See application file for complete search history.

(56) References Cited

U.S. PATENT DOCUMENTS

| | | |
|---|---|---|
| 3,852,519 A | 12/1974 | Court |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |

(Continued)

FOREIGN PATENT DOCUMENTS

EP    0471373    2/1992

(Continued)

OTHER PUBLICATIONS

Liu, et al. Motion Vector Encryption in Multimedia Streaming, 2004, IEEE, pp. 64-71.

(Continued)

*Primary Examiner*—Kambiz Zand
*Assistant Examiner*—Benjamin E. Lanier
(74) *Attorney, Agent, or Firm*—Miller Patent Services; Jerry A. Miller

(57) ABSTRACT

Certain embodiments consistent with the present invention involve a method of selectively encrypting and decoding digital video content. Certain of the packets are selected for encryption according to a selection criterion, wherein the selected packets exclude packets containing start of frame (SOF) headers. The selected packets are encrypted while retaining the packets containing the SOF headers unencrypted to form selectively encrypted digital video content. In decoding selectively encrypted digital video content, offsets are calculated for at least one of I frames and P frames from the SOF headers and the calculated offsets are stored as an offset table. The offset table can then be accessed to enable trick play of the selectively encrypted digital video content.

32 Claims, 4 Drawing Sheets

U.S. PATENT DOCUMENTS

| | | |
|---|---|---|
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,699,429 A | 12/1997 | Tamer et al. |
| 5,703,889 A | 12/1997 | Shimoda et al. |
| 5,717,814 A | 2/1998 | Abecassis |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,915,018 A | 6/1999 | Aucsmith |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,973,679 A | 10/1999 | Abbott et al. |
| 5,973,722 A | 10/1999 | Wakai et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,021,199 A | 2/2000 | Ishibashi |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobsson |
| 6,055,314 A | 4/2000 | Spies et al. |
| 6,055,315 A | 4/2000 | Doyle et al. |
| 6,057,872 A | 5/2000 | Candelore |
| 6,058,186 A | 5/2000 | Enari |
| 6,058,192 A | 5/2000 | Guralnick et al. |
| 6,061,451 A | 5/2000 | Muratani et al. |
| 6,064,748 A | 5/2000 | Hogan |
| 6,065,050 A | 5/2000 | DeMoney |
| 6,069,647 A | 5/2000 | Sullivan et al. |
| 6,070,245 A | 5/2000 | Murphy, Jr. et al. |
| 6,072,872 A | 6/2000 | Chang et al. |
| 6,072,873 A | 6/2000 | Bewick |
| 6,073,122 A | 6/2000 | Wool |
| 6,088,450 A | 7/2000 | Davis et al. |
| 6,105,134 A | 8/2000 | Pinder et al. |
| 6,108,422 A | 8/2000 | Newby et al. |
| 6,115,821 A | 9/2000 | Newby et al. |
| 6,118,873 A | 9/2000 | Lotspiech et al. |
| 6,134,551 A | 10/2000 | Aucsmith |
| 6,138,237 A | 10/2000 | Ruben et al. |

| | | | |
|---|---|---|---|
| 6,148,082 A | 11/2000 | Slattery et al. | |
| 6,154,206 A | 11/2000 | Ludtke | |
| 6,157,719 A | 12/2000 | Wasilewski et al. | |
| 6,181,334 B1 | 1/2001 | Freeman et al. | |
| 6,185,369 B1 | 2/2001 | Ko et al. | |
| 6,185,546 B1 | 2/2001 | Davis | |
| 6,189,096 B1 | 2/2001 | Haverty | |
| 6,192,131 B1 | 2/2001 | Geer et al. | |
| 6,199,053 B1 | 3/2001 | Herbert et al. | |
| 6,204,843 B1 | 3/2001 | Freeman et al. | |
| 6,209,098 B1 | 3/2001 | Davis | |
| 6,215,484 B1 | 4/2001 | Freeman et al. | |
| 6,226,618 B1 | 5/2001 | Downs | |
| 6,229,895 B1 | 5/2001 | Son et al. | |
| 6,230,194 B1 | 5/2001 | Frailong et al. | |
| 6,230,266 B1 | 5/2001 | Perlman et al. | |
| 6,236,727 B1 | 5/2001 | Ciacelli et al. | |
| 6,240,553 B1 | 5/2001 | Son et al. | |
| 6,246,720 B1 | 6/2001 | Kutner et al. | |
| 6,256,747 B1 | 7/2001 | Inohara et al. | |
| 6,263,506 B1 | 7/2001 | Ezaki et al. | |
| 6,266,416 B1 | 7/2001 | Sigbjornsen et al. | |
| 6,266,480 B1 | 7/2001 | Ezaki et al. | |
| 6,272,538 B1 | 8/2001 | Holden et al. | |
| 6,278,783 B1 | 8/2001 | Kocher et al. | |
| 6,289,455 B1 | 9/2001 | Kocher et al. | |
| 6,292,568 B1 | 9/2001 | Atkins, III et al. | |
| 6,292,892 B1 | 9/2001 | Davis | |
| 6,307,939 B1 | 10/2001 | Vigarie | |
| 6,311,012 B1 | 10/2001 | Cho et al. | |
| 6,324,288 B1 | 11/2001 | Hoffman | |
| 6,351,538 B1 | 2/2002 | Uz | |
| 6,378,130 B1 | 4/2002 | Adams | |
| 6,389,533 B1 | 5/2002 | Davis et al. | |
| 6,389,537 B1 | 5/2002 | Davis et al. | |
| 6,415,031 B1 | 7/2002 | Colligan et al. | |
| 6,415,101 B1 | 7/2002 | deCarmo et al. | |
| 6,430,361 B1 | 8/2002 | Lee | |
| 6,445,738 B1 * | 9/2002 | Zdepski et al. | 375/240.01 |
| 6,449,718 B1 | 9/2002 | Rucklidge et al. | |
| 6,453,115 B1 * | 9/2002 | Boyle | 386/68 |
| 6,456,985 B1 | 9/2002 | Ohtsuka | |
| 6,459,427 B1 | 10/2002 | Mao et al. | |
| 6,463,152 B1 | 10/2002 | Takahashi | |
| 6,466,671 B1 | 10/2002 | Maillard et al. | |
| 6,505,032 B1 | 1/2003 | McCorkle et al. | |
| 6,505,299 B1 | 1/2003 | Zeng et al. | |
| 6,510,554 B1 | 1/2003 | Gorden et al. | |
| 6,519,693 B1 | 2/2003 | Debey | |
| 6,529,526 B1 | 3/2003 | Schneidewend | |
| 6,543,053 B1 | 4/2003 | Li et al. | |
| 6,549,229 B1 | 4/2003 | Kirby et al. | |
| 6,557,031 B1 | 4/2003 | Mimura et al. | |
| 6,587,561 B1 | 7/2003 | Sered et al. | |
| 6,640,145 B1 | 10/2003 | Hoffberg et al. | |
| 6,650,754 B1 | 11/2003 | Akiyama et al. | |
| 6,654,389 B1 | 11/2003 | Brunheroto et al. | |
| 6,678,740 B1 | 1/2004 | Rakib et al. | |
| 6,681,326 B1 | 1/2004 | Son et al. | |
| 6,684,250 B1 | 1/2004 | Anderson et al. | |
| 6,697,944 B1 | 2/2004 | Jones et al. | |
| 6,754,276 B1 | 6/2004 | Harumoto et al. | |
| 6,772,340 B1 | 8/2004 | Peinado et al. | |
| 6,788,690 B1 | 9/2004 | Harri | |
| 6,826,185 B1 | 11/2004 | Montanaro et al. | |
| 6,891,565 B1 | 5/2005 | Dietrich | |
| 6,904,520 B1 | 6/2005 | Rosset et al. | |
| 6,976,166 B1 | 12/2005 | Herley et al. | |
| 2001/0030959 A1 | 10/2001 | Ozawa et al. | |
| 2002/0026587 A1 | 2/2002 | Talstra et al. | |
| 2002/0046406 A1 | 4/2002 | Chelehmal et al. | |
| 2002/0047915 A1 | 4/2002 | Misu | |
| 2002/0059425 A1 | 5/2002 | Belfiore et al. | |
| 2002/0083317 A1 | 6/2002 | Ohta et al. | |
| 2002/0083438 A1 | 6/2002 | So et al. | |
| 2002/0097322 A1 | 7/2002 | Monroe et al. | |
| 2002/0108035 A1 | 8/2002 | Herley et al. | |
| 2002/0129243 A1 | 9/2002 | Nanjundiah | |
| 2002/0150239 A1 | 10/2002 | Carny et al. | |
| 2002/0170053 A1 | 11/2002 | Peterka et al. | |
| 2002/0184506 A1 * | 12/2002 | Perlman | 713/182 |
| 2002/0194613 A1 | 12/2002 | Unger | |
| 2002/0196939 A1 | 12/2002 | Unger et al. | |
| 2003/0002854 A1 | 1/2003 | Belknap et al. | |
| 2003/0009669 A1 | 1/2003 | White et al. | |
| 2003/0021412 A1 | 1/2003 | Candelore et al. | |
| 2003/0026423 A1 | 2/2003 | Unger et al. | |
| 2003/0046686 A1 | 3/2003 | Candelore et al. | |
| 2003/0063615 A1 | 4/2003 | Luoma et al. | |
| 2003/0072555 A1 | 4/2003 | Yap et al. | |
| 2003/0077071 A1 | 4/2003 | Lin et al. | |
| 2003/0081630 A1 | 5/2003 | Mowery et al. | |
| 2003/0081776 A1 | 5/2003 | Candelore | |
| 2003/0084284 A1 | 5/2003 | Ando et al. | |
| 2003/0097662 A1 | 5/2003 | Russ et al. | |
| 2003/0112333 A1 | 6/2003 | Chen et al. | |
| 2003/0118243 A1 | 6/2003 | Sezer et al. | |
| 2003/0123664 A1 | 7/2003 | Pedlow et al. | |
| 2003/0123849 A1 | 7/2003 | Nallur et al. | |
| 2003/0123864 A1 | 7/2003 | Pedlow, Jr. et al. | |
| 2003/0126086 A1 | 7/2003 | Safadi | |
| 2003/0133570 A1 | 7/2003 | Candelore et al. | |
| 2003/0140257 A1 | 7/2003 | Peterka et al. | |
| 2003/0145329 A1 | 7/2003 | Candelore | |
| 2003/0152224 A1 | 8/2003 | Candelore et al. | |
| 2003/0152226 A1 | 8/2003 | Candelore et al. | |
| 2003/0156718 A1 | 8/2003 | Candelore et al. | |
| 2003/0159139 A1 | 8/2003 | Candelore et al. | |
| 2003/0159140 A1 | 8/2003 | Candelore | |
| 2003/0159152 A1 | 8/2003 | Lin et al. | |
| 2003/0174837 A1 | 9/2003 | Candelore et al. | |
| 2003/0188154 A1 | 10/2003 | Dallard | |
| 2003/0193973 A1 | 10/2003 | Takashimizu et al. | |
| 2003/0198223 A1 | 10/2003 | Mack et al. | |
| 2003/0204717 A1 | 10/2003 | Kuehnel | |
| 2003/0226149 A1 | 12/2003 | Chun et al. | |
| 2003/0228018 A1 | 12/2003 | Vince | |
| 2004/0003008 A1 | 1/2004 | Wasilewski et al. | |
| 2004/0010717 A1 | 1/2004 | Simec et al. | |
| 2004/0028227 A1 | 2/2004 | Yu | |
| 2004/0047470 A1 | 3/2004 | Candelore | |
| 2004/0049688 A1 | 3/2004 | Candelore et al. | |
| 2004/0049690 A1 | 3/2004 | Candelore et al. | |
| 2004/0049691 A1 | 3/2004 | Candelore et al. | |
| 2004/0049694 A1 | 3/2004 | Candelore | |
| 2004/0078575 A1 | 4/2004 | Morten et al. | |
| 2004/0081333 A1 | 4/2004 | Grab et al. | |
| 2004/0091109 A1 | 5/2004 | Son et al. | |
| 2004/0123094 A1 | 6/2004 | Sprunk | |
| 2004/0139337 A1 | 7/2004 | Pinder et al. | |
| 2004/0165586 A1 | 8/2004 | Read et al. | |
| 2004/0187161 A1 | 9/2004 | Cao | |
| 2004/0193550 A1 | 9/2004 | Siegal | |
| 2005/0004875 A1 | 1/2005 | Kontio et al. | |
| 2005/0071669 A1 | 3/2005 | Medvinsky et al. | |
| 2005/0169473 A1 | 8/2005 | Candelore | |
| 2005/0192904 A1 | 9/2005 | Candelore | |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |

| | | |
|---|---|---|
| EP | 0674441 | 9/1995 |
| EP | 0833517 | 4/1998 |
| EP | 0866615 | 9/1998 |
| EP | 1 187 483 A2 | 3/2002 |
| EP | 1187483 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/65762 | 9/2001 |
| WO | WO 01/78386 | 10/2001 |
| WO | WO 01/78386 A2 | 10/2001 |

OTHER PUBLICATIONS

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

Kunkelmann T. et al., A scalable security architecture for multimedia communication standards, Darmstard Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

"A Report on Security Issues in Multimedia" by Gulwani, pp. 10-14, Apr. 30, 2000, Course Notes, Department of Computer Science and Engineering, Indian Institute of Technology Kanpur.

"Ad Agencies and Advertisers To Be Empowered with Targeted Ads Delivered by Television's Prevailing Video Servers" Article Business Section of The New York Times, Updated Thursday, Dec. 20, 2001.

"An Efficient MPEG Video Encryption Alogrithm" by Shi and Bhargava, pp. 381-386, 1998 IEEE.

"An Empirical Study of Secure MPEG Video Transmissions" by Agi and Gong, pp. 137-144, 1996, IEEE, Proceedings of SNDSS '96.

"Applying Encryption to Video Communication" by Kunkelmann, pp. 41-47, Sep. 1998, Multimedia and Security Workshop at ACM Multimedia '98. Bristol, U.K.

"Comparison of MPEG Encryption Algorithms" by Qiao and Nahrstedt, Jan. 17, 1998, Preprint submitted to Elsevier Science.

"Coral Consortium Aims to Make DRM Interoperable", by Bill Rosenblatt, Oct. 7, 2004, online at http://www.drmwatch.com/standards/article.php/3418741.

"DVD Demystified—The Guidebook for DVD-Video and DVD-ROM" by Jim Taylor, Pub. McGraw-Hill, 1998, ISBN: 0-07-064841-7, pp. 134-147.

"Dynamic-Customized TV Advertising Creation and Production Tools" by SeaChange International, Web Site Literature.

"Efficient Frequency Domain Video Scrambling for Content Access Control" by Zeng and Lei, Nov. 1999, In Proc. ACM Multimedia.

"Evaluation of Selective Encryption Techniques for Secure Transmission of MPEG-Compressed Bit-Streams" by Alattar and Al-Regib, pp. IV-340 to IV-343, 1999, IEEE.

"Fast Encryption Methods for Audiovisual Data Confidentiality" by Wu and Kuo, Nov. 2000, SPIE International Symposia on Information Technologies 2000, (Boston, Ma., USA).

"Improved Selective Encryption Techniques for Secure Transmission of MPEG Video Bit-Streams" by Alattar, Al-Regib and Al-Semari, pp. 256-260, 1999, IEEE.

Metro Media™ PVR-DVD-MP3-Web—Internet publication from www.metrolink.com, undated.

"Multimedia and Security Workshop at ACM Multimedia" '98. Bristol, U.K., Sep. 1998.

"Passage™, Freedom to Choose", 2003, Sony Electronics Inc.

"Performance Study of a Selective Encryption Scheme for the Security of Networked, Real-Time Video" by Spanos and Maples, pp. 2-10, 1995, IEEE.

"Pre-Encryption Profiles—Concept Overview and Proposal", Rev. 1.2 as submitted to the Open CAS consortium on Dec. 28, 2000.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"Selective Encryption and Watermarking of MPEG Video (Extended Abstract)" by Wu and Wu, Feb. 17, 1997, submitted to International Conference on Image Science, Systems, and Technology, CISST'97.

"The Long March to Interoperable Digital Rights Management" by Koenen et al., pp. 1-17, 2004, IEEE.

"Transport Streams Insertion of Video in the Compressed Digital Domain" by SeaChange International, Web Site Literature, 2000.

"Visible World—A High Impact Approach to Customized Television Advertising" by Haberman, Dec. 2001.

Anonymous, Message Authentication with Partial Encryption, Research discosure RD 296086, Dec. 10, 1998.

McCormac Hack Over Cablemodem, HackWatch, Aug. 10, 1998.

Anonymous, New Digital Copy Protection Proposal Would Secure Authorized Copies, PR Newswire, Nov. 1998, pp. 1-3.

Aravind, H., et al., "Image and Video Coding Standards", AT&T Technical Journal, (Jan./Feb. 1993),67-68.

Gonzalez, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia,(Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993),704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 3, 1993).

"ClearPlay: The Technology of Choice", from web site, ClearPlay 2001-2003.

"An Efficient MPEG Video Encryption Algorithm" by Shi and Bhargava, pp. 381-386, 1998 IEEE.

"Comparison of MPEG Encryption Algorithms" Qioa and Nahrstedt, Department of Computer Science, University of Illinois at Urbana-Champaign, Jan. 17, 1998.

"A Report on Security Issues in Multimedia" by Gulwani, pp. 10-14, Apr. 30, 2000, (Boston, Ma.,USA).

"Pre-Encryption Profiles Concept Overview and Proposal" Rev. 1.2, John B. Carlucci, Dec. 5, 2000.

"How Networks Work—Milennium Edition"—pp. 88-89, Que Corporation, 2000.

* cited by examiner

SELECTIVE ENCRYPTION TO ENABLE TRICK PLAY

CROSS REFERENCE TO RELATED DOCUMENTS

This application is a continuation of pending U.S. patent application Ser. No. 10/319,096, filed Dec. 13, 2002 to Candelore et al. entitled "Encryption to Enable Trick Play", and is also related to and claims priority benefit of U.S. Provisional patent application Ser. No. 60/409,675, filed Sep. 9, 2002, entitled "Generic PID Remapping for Content Replacement", to Candelore. These applications are hereby incorporated by reference herein.

This application is also related to patent applications entitled "Critical Packet Partial Encryption" to Unger et al., Ser. No. 10/038,217; patent applications entitled "Time Division Partial Encryption" to Candelore et al., Ser. No. 10/038,032; entitled "Elementary Stream Partial Encryption", to Candelore, Ser. No. 10/037,914; entitled "Partial Encryption and PID Mapping" to Unger et al., Ser. No. 10/037,499; entitled "Decoding and Decrypting of Partially Encrypted Information" to Unger et al., Ser. No. 10/037,498 all of which were filed on Jan. 2, 2002 and are hereby incorporated by reference herein.

This application is also related to U.S. patent applications Ser. No. 10/273,905, filed Oct. 18, 2002 to Candelore et al., entitled "Video Slice and Active Region Based Dual Partial Encryption", Ser. No. 10/273,903, filed Oct. 18, 2002 to Candelore et al., entitled "Star Pattern Partial Encryption", Ser. No. 10/274,084, filed Oct. 18, 2002 to Candelore et al., entitled "Slice Mask and Moat Pattern Partial Encryption", Ser. No. 10/274,019, filed Oct. 18, 2002 to Candelore et al., entitled "Video Scene Change Detection", which are hereby incorporated by reference.

COPYRIGHT NOTICE

A portion of the disclosure of this patent document contains material which is subject to copyright protection. The copyright owner has no objection to the facsimile, reproduction of the patent document or the patent disclosure, as it appears in the Patent and Trademark Office patent file or records, but otherwise reserves all copyright rights whatsoever.

FIELD OF THE INVENTION

This invention relates generally to the field of encryption of digital video content. More particularly, this invention relates to use of selective encryption to permit trick play with digital video content.

BACKGROUND OF THE INVENTION

When digital video such as MPEG (Moving Pictures Expert Group) digital video is played back in various trick play modes, access to I frames or P frames is generally required. I frames and P frames contain information that can be used to directly represent an image, whereas images are created with B frames by referencing and modifying preceding and/or subsequent I frames and P frames. As an example, when playback is carried out at 2x or 4x speed, the playback algorithm jumps from I frame to I frame or P frame to P frame to speed up the presentation of the video frames while skipping certain frames.

Unfortunately, when content is encrypted using traditional encryption techniques, trick play becomes difficult or impossible since content has to be decrypted in order to find the I frames and/or P frames. In the case of unencrypted content, these frames are accessed by calculating an offset from the start of frame (SOF).

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
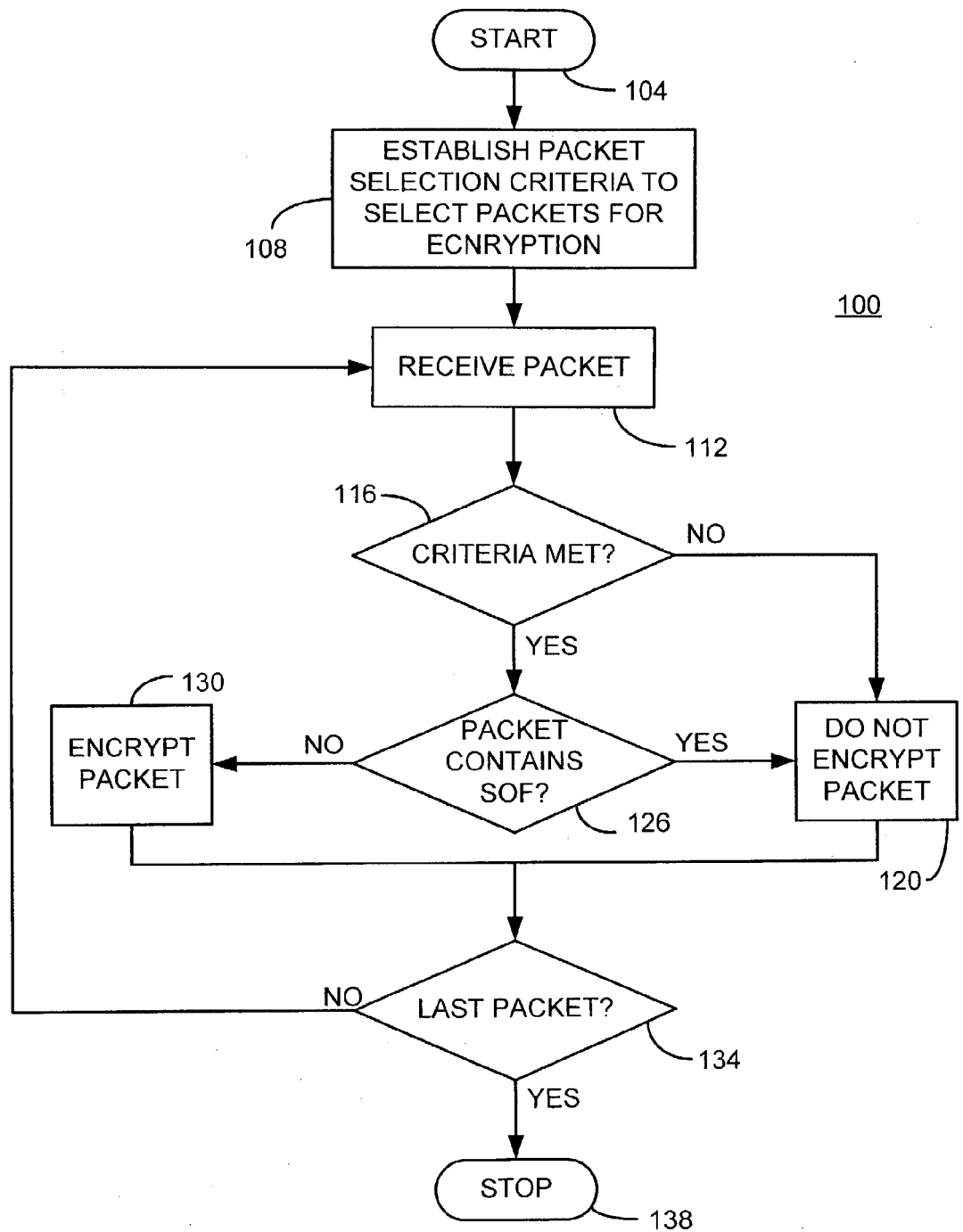
FIG. 1 is a flow chart showing a selective encryption process and decoding process consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. The term "video" may be used herein to embrace not only true visual information, but also in the conversational sense (e.g., "video tape recorder") to embrace not only video signals but associated audio and data. The present document generally uses the example of a "dual selective encryption" embodiment, but those skilled in the art will recognize that the present invention can be utilized to realize multiple partial encryption without departing from the invention. The terms "partial encryption" and "selective encryption" are used synonymously herein. Also, the terms "program" and "television program" and similar terms can be interpreted in the normal conversational sense, as well as a meaning wherein the term means any segment of A/V content that can be displayed on a television set or similar monitor device. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention.

The above-referenced commonly owned patent applications describe inventions relating to various aspects of methods generally referred to herein as partial encryption or selective encryption. More particularly, systems are described wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

The present invention applies similar selective encryption techniques to the problem of enabling trick play with encrypted digital video content. The partial encryption processes described in the above patent applications utilize any suitable encryption method. However, these encryption techniques are selectively applied to the data stream, rather than encrypting the entire data stream, using techniques described in the above-referenced patent applications. In general, but without the intent to be limiting, the selective encryption process utilizes intelligent selection of information to encrypt so that the entire program does not have to undergo dual encryption. By appropriate selection of data to encrypt, the program material can be effectively scrambled and hidden from those who desire to hack into the system and illegally recover commercial content without paying. MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data. Thus, encryption of this anchor data, for example, or other key data can effectively render the video un-viewable.

In accordance with certain embodiments consistent with the present invention, the selected video data to be encrypted may be any individual one or combination of the following (described in greater detail in the above applications): video slice headers appearing in an active region of a video frame, data representing an active region of a video frame, data in a star pattern within the video frame, data representing scene changes, I Frame packets, packets containing motion vectors in a first P frame following an I Frame, packets having an intra_slice_flag indicator set, packets having an intra_slice indicator set, packets containing an intra_coded macroblock, data for a slice containing an intra_coded macroblock, data from a first macroblock following the video slice header, packets containing video slice headers, anchor data, and P Frame data for progressively refreshed video data, data arranged in vertical and or horizontal moat patterns on the video frame, and any other selected data that renders the video and/or audio difficult to utilize. Several such techniques as well as others are disclosed in the above-referenced patent applications, any of which (or other techniques) can be utilized with the present invention to encrypt only a portion of the content, so long as the packets containing the SOF header is not encrypted, as will be explained later.

Currently there is a problem with delivering content to a personal-video-recorder (PVR) enabled set-top box is that to enable trick play it must be first descrambled. If the content is downloaded "opportunistically" from a carrousel at night, then descrambling (and locally re-scrambling) the content can cause a security problem. Keys used to locally re-scramble the content will not be as secure as those from the conditional access (CA) element. The content on the hard drive might be accessed without paying the appropriate viewing fees. Ideally, content delivered "opportunistically" or speculatively to a local drive of a set-top box would remain CA scrambled on the hard drive.

In accordance with certain embodiments consistent with the present invention, selective encryption is utilized to encrypt selective portions of content, but leaves the packets containing the SOF header in the clear (unencrypted). By leaving the SOF header unencrypted, trick play circuits and algorithms can operate properly. The remainder of the content can be encrypted fully or selectively according to any of the selective encryption schemes described in the copending applications, or any other suitable selective encryption content selection criterion.

FIG. 1 describes a process 100, in accord with certain embodiments consistent with the present invention, starting at 104. A packet selection criterion is established at 108 for determining which packets are to be encrypted. Such selection criterion can, for example, be established in accord with any of the above-referenced selective encryption selection criteria (including full encryption of all content except SOF header packets). Once the selection criterion is established, packets can be received at 112. If the packet does not meet the selection criterion at 116, then the packet is not encrypted at 120. If the packet does meet the selection criterion at 116, then control passes to 126 where the packet is examined to determine if it contains the SOF header. If so, the packet is not encrypted at 120. If not, the packet is encrypted at 130. Control passe from 120 or 130 to 134. At 134, if the last packet has not been encountered, the next packet is received at 112. If the last packet has been received at 134, the process stops at 138.

Thus, in accord with one embodiment consistent with the invention, a method of selectively encrypting digital video content, involves receiving a plurality of packets containing the digital video content; selecting certain of the packets for encryption according to a selection criterion, wherein the selected packets exclude certain packets containing start of frame (SOF) headers; encrypting the selected packets; and retaining the packets containing the SOF headers unencrypted to form selectively encrypted digital video content.

A method of decoding selectively encrypted digital video content, consistent with certain embodiments, involves receiving the selectively encrypted digital video content, wherein the selectively encrypted digital video content has unencrypted packets containing start of frame (SOF) headers; calculating offsets for at least one of I frames and P frames from the SOF headers; and storing the calculated offsets as an offset table. The offset table can be accessed to enable trick play of the selectively encrypted digital video content by identifying the location of I and/or P frames.

A selective encryption encoder for selective encryption of digital video content, consistent with certain embodiments of the present invention receives a plurality of packets containing the digital video content. A programmed processor selects certain of the packets for encryption according to a selection criterion, wherein the selected packets exclude packets containing start of frame (SOF) headers. An encrypter encrypts the selected packets while retaining the packets containing the SOF headers unencrypted to form selectively encrypted digital video content. The selectively encrypted content can then be stored on an electronic storage medium and/or transmitted to a receiver such as a television Set-top box.

In certain embodiments consistent with the present invention, all of the packets containing SOF headers can be left encrypted. However, this should not be considered limiting since in other embodiments only certain of the packets containing SOF headers might be left unencrypted, while others are encrypted. By way of example, and not limitation, I frames may generally be the more important frames containing SOF headers to have in the clear. Thus, some or all of the packets containing I frame SOF headers may be passed in the clear while other packets containing SOF headers may be encrypted. For example, B and/or P frame packets containing SOF headers, in many instances may be encrypted freely while I frame packets containing SOF headers are kept in the clear. Many variations with various advantages may be contemplated by those skilled in the art upon consideration of this teaching.

Figure 2:
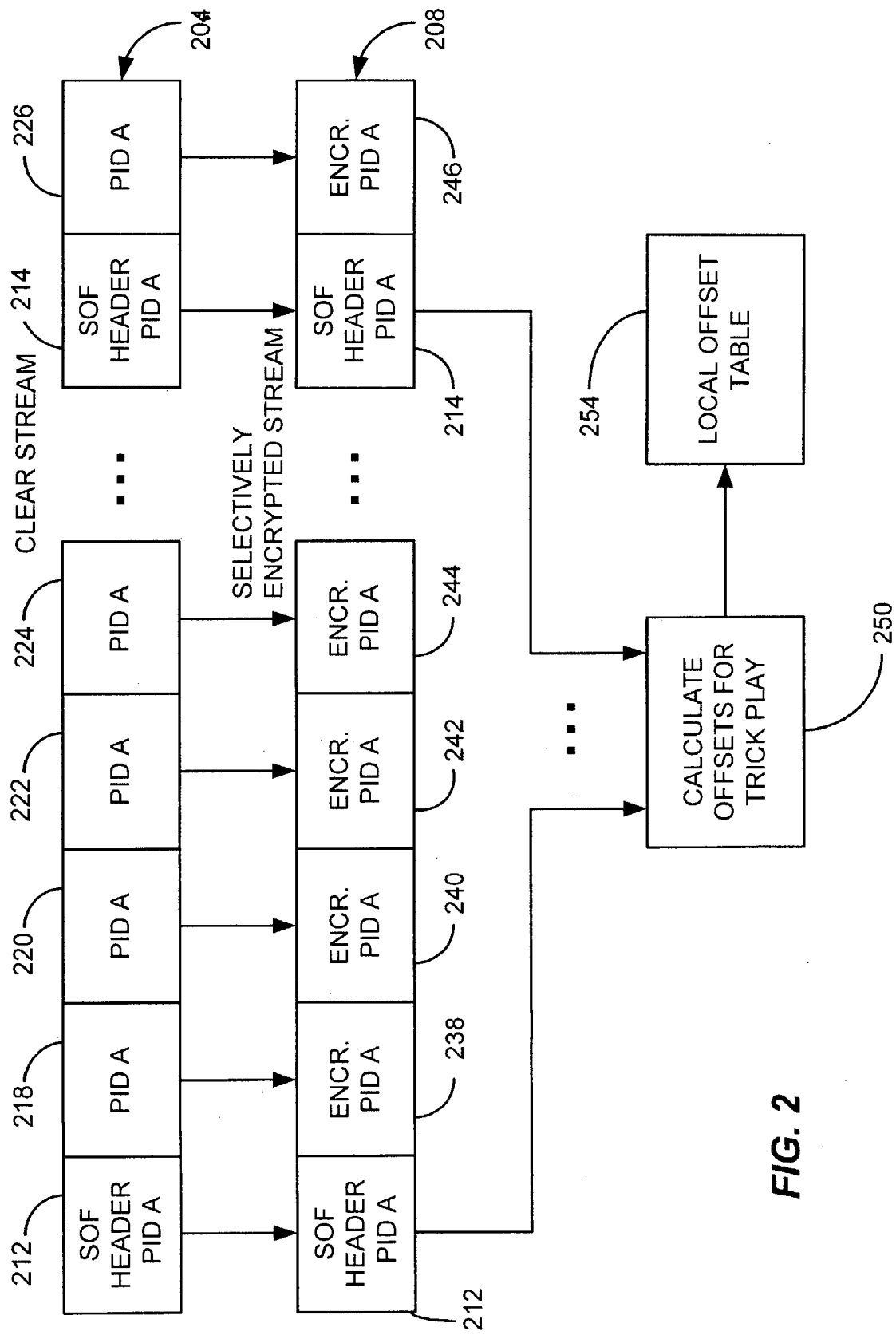
FIG. 2 illustrates one embodiment of a selective encryption and decoding process consistent with certain embodiments of the present invention.

FIG. 2 depicts an embodiment of this process wherein a clear stream of data 204 is converted to a selectively encrypted stream of data 208. Clear stream 204 contains a sequence of packets each having program identifier (PID) A. Packets 212 and 214 contain SOF headers, while packets 218, 220, 222, 224 and 226 contain oilier information that forms a part of the video data stream. As a part of the encryption process of this example, all packets except those containing SOF headers are encrypted. Thus, packets 212 and 214 are transferred directly to the selectively encrypted stream 208. Packets 218, 220, 222, 224 and 226 are encrypted to produce encrypted packets 238, 240, 242, 244 and 246, respectively. At the decoder (e.g., in a television Set-top box (STB), the fact that the SOF headers are unencrypted enables calculation of offsets for trick play at 240. These offsets can then be stored in a local trick play offset table at 254 to enable rapid access to the proper I and/or P frames, and thus produce trick play.

Figure 3:
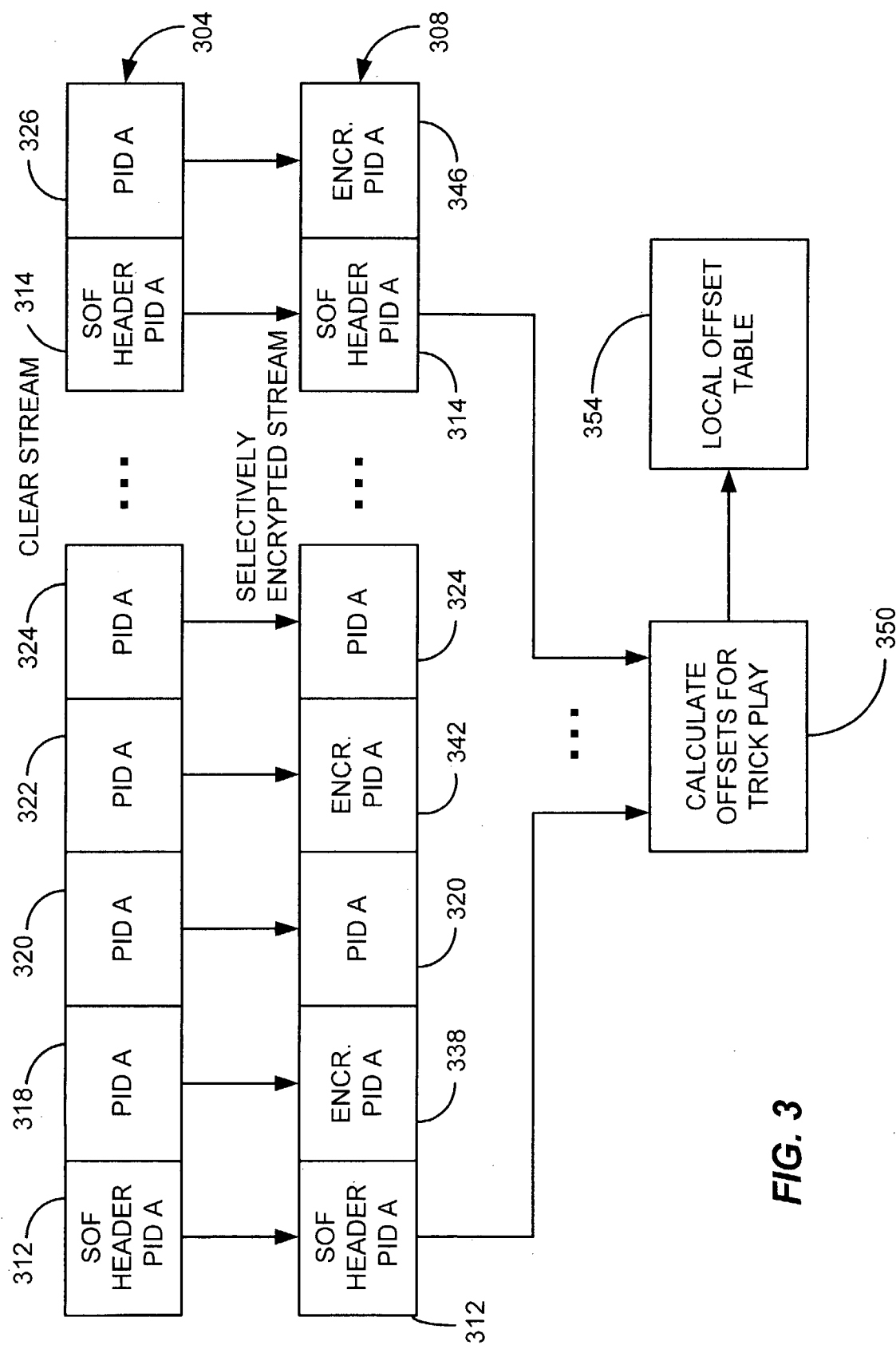
FIG. 3 illustrates another embodiment of a selective encryption and decoding process consistent with certain embodiments of the present invention.

FIG. 3 depicts an embodiment of this process wherein a clear stream of data 304 is converted to a selectively encrypted stream of data 308. In this example, the selective encryption selection criterion is one that only partially encrypts packets not containing SOF headers. Clear stream 304 contains a sequence of packets each having program identifier (PID) A. Packets 312 and 314 contain SOF headers, while packets 318, 320, 322, 324 and 326 contain other information forming part of the stream of video. As a part of the encryption process of this example, only certain of the packets containing information other than the SOF header are encrypted. As illustrated, packets 312 and 314 are transferred directly to the selectively encrypted stream 308. Packets 318, 322 and 326 are encrypted to produce encrypted packets 338, 342 and 346, respectively. At the decoder (e.g., in a television STB), the fact. that the SOF headers are unencrypted enables calculation of offsets for trick play at 350. These offsets can then be stored in a local trick play offset table at 354 to enable rapid access to the proper I and/or P frames, and thus produce trick play.

When selectively encrypted digital video content is created as streams 208 or 308, the selectively encrypted digital video content can then be stored on an electronic storage medium or transmitted to one or more recipients (e.g., by downloading, streaming or broadcast by a cable or satellite content provider to subscriber's Set-top boxes serving as receivers and decoders.

Thus, certain embodiments of the present invention keep the SOF header packets in the clear. This allows commercially available decoder chips such as the model number 7030 manufactured and sold by Broadcom Corporation to calculate the byte offset to I, P and B frames. For trick play operation, the offset allows a decoder (e.g., a Set-top box) to display, for example, every second I Frame or fourth I frame without decoding other content. While the SOF headers are not encrypted, the rest of the content does not need to be completely encrypted, as described above.

Figure 4:
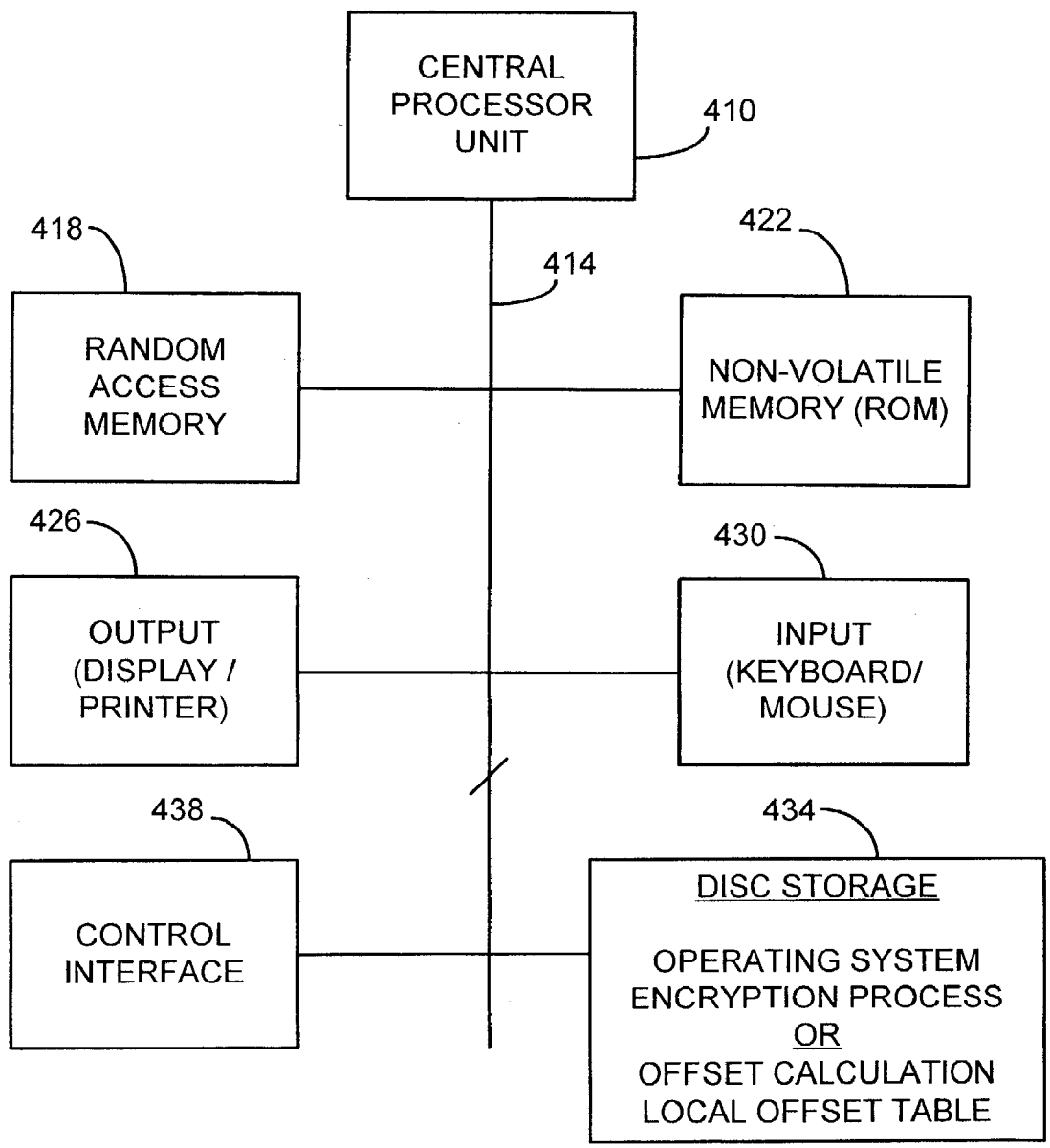
FIG. 4 is a programmed processor which can represent either an encryption processor or a decoder consistent with certain embodiments of the present invention.

The processes above can be carried out on any suitable programmed general purpose processor operating as a server/encoder such as that depicted as computer 400 of FIG. 4. Computer 400 can represent either an encryption processor or a decoder depending upon programming. Computer 400 has one or more central processor units (CPU) 410 with one or more associated buses 414 used to connect the central processor unit 410 to Random Access Memory 418 and Non-Volatile Memory 422 in a known manner. Output devices 426, such as a display and printer, may be provided in order to display and/or print output for the use of the MSO or user as well as to provide a user interface such as a Graphical User Interface (GUI). Similarly, input devices such as keyboard, mouse and removable media readers 430 may be provided for the input of information by the operator. Computer 400 also may incorporate internal and/or external attached disc or other mass storage 434 (e.g., disc and/or optical storage) for storing large amounts of information including, but not limited to, the operating system, encryption processes (for the encryption encoder), or offset calculation and local offset table if computer 400 is used as a decoder (e.g., forming a part of a television STB). The Computer system 400 also has an interface 438 for connection to the cable system if present at the MSO. While depicted as a single computer, the digital content provider may utilize multiple linked computers to carry out the functions described herein.

Those skilled in the art will recognize that the present invention has been described in terms of exemplary embodiments based upon use of a programmed processor (e.g., computer 400). However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention. Moreover, although the present invention has been described in terms of a general purpose personal computer providing a playback mechanism, the playback can be carried on a dedicated machine without departing from the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of selectively encrypting digital video content, comprising;
   receiving a plurality of packets containing the digital video content;
   selecting packets from the plurality of packets for encryption according to a selection criterion, wherein the selection criterion is explicitly based at least in part upon the presence or absence of a start of frame (SOF) header in the selected packets, and wherein the selected packets exclude certain packets containing SOF headers;
   encrypting the selected packets; and
   retaining the certain packets containing the SOF headers unencrypted to form selectively encrypted digital video content.

2. The method according to claim 1, further comprising storing the selectively encrypted digital video content on an electronic storage medium.

3. The method according to claim 1, further comprising transmitting the selectively encrypted digital video content to a receiver.

4. The method according to claim 1, wherein the selection criterion comprises selection of all packets except those packets containing the SOF header.

5. The method according to claim 1, wherein the selection criterion comprises selection of packets except those certain packets containing the SOF header where the selected packets represent less than all of the remaining packets excluding those certain packets containing the SOF header.

6. The method according to claim 1, wherein at least one packet containing an SOF header is not one of the certain packets containing a SOF header and is encrypted.

7. The method according to claim 1, wherein the certain packets containing the SOF headers comprise I frame packets.

8. The method according to claim 1, carried out on a programmed processor.

9. An electronic computer readable storage medium storing instructions that, when executed on a programmed processor, carry out the method of selectively encrypting digital video cement according to claim 1.

10. A method of decoding selectively encrypted digital video content comprising:
    receiving the selectively encrypted digital video content, wherein the selectively encrypted digital video content has certain unencrypted packets containing start of frame (SOF) headers, wherein the certain unencrypted packets were selected based upon a selection criterion that is explicitly based at least in part upon the presence or absence of a start of an SOF header in the selected packets;
    calculating offsets for at least one of I frames and P frames from the SOF headers; and
    storing the calculated offsets as an offset table.

11. The method according to claim 10, further comprising accessing the offset table to enable trick play of the selectively encrypted digital video content.

12. The method according to claim 10, wherein the selectively encrypted digital video content is stored on an electronic storage medium.

13. The method according to claim 10, wherein the selectively encrypted digital video content is transmitted from a content provider to a receiver.

14. The method according to claim 10, wherein the selectively encrypted digital video content is fully encrypted except for certain packets containing SOF headers.

15. The method according to claim 10, wherein the selectively encrypted digital video content comprises the certain unencrypted packets containing SOF headers, encrypted packets containing SOF headers, packets that do not contain SOF headers that are encrypted, and packets that do not contain SOF headers that are unencrypted.

16. The method according to claim 10, wherein at least one packet containing an SOF header is not one of the certain packets containing a SOF header and is encrypted.

17. The method according to claim 10, wherein the certain packets containing the SOF headers comprise I frame packets.

18. The method according to claim 10, carried out on a programmed processor.

19. An electronic storage medium storing instructions that, when executed on a programmed processor, carry out the method of decoding selectively encrypted digital video content according to claim 10.

20. A decoder for decoding selectively encrypted digital video content, comprising:
   a receiver that receives the selectively encrypted digital video content, wherein the selectively encrypted digital video content has unencrypted packets containing start of frame (SOF) headers;
   wherein the certain unencrypted packets were selected based upon a selection criterion that is explicitly based at least in part upon the presence or absence of a start of an SOF header in the selected packets;
   an offset calculator tat calculates offsets for at least one of I frames and P frames from the SOF headers; and
   means for storing the calculated offsets as an offset table.

21. The decoder according to claim 20, further comprising means for accessing the offset table to enable trick play of the selectively encrypted digital video content.

22. The decoder according to claim 20, wherein, the selectively encrypted digital video content is stored on an electronic storage medium.

23. The decoder according to claim 20, wherein the selectively encrypted digital video content is transmitted from a content provider to a receiver.

24. The decoder according to claim 20, wherein the selectively encrypted digital video content is fully encrypted except for the certain packets containing the SOF header.

25. The decoder according to claim 20, wherein the selectively encrypted digital video content comprises unencrypted packets containing SOF headers, encrypted packets containing SOF headers that are encrypted, packets that do not contain SOF headers that are encrypted, and packets that do not contain SOF headers that are unencrypted.

26. The decoder according to claim 20, wherein the offset calculator is implemented by a programmed processor.

27. The decoder according to claim 20, wherein the offset table is stored in an electronic storage medium.

28. A selective encryption encoder for selective encryption of digital video content, comprising;
   means for receiving a plurality of packets containing the digital video content;
   a programmed processor that selects packets for encryption according to a selection criterion, wherein the selected packets exclude certain packets containing start of frame (SOF) headers;
   wherein the selection criterion is explicitly based at least in part upon the presence or absence of a SOF header in the selected packets; and
   an encrypter for encrypting the selected packets while retaining the certain packets containing the SOF headers unencrypted to form selectively encrypted digital video content.

29. The encoder according to claim 28, further comprising an electronic storage medium for storing the selectively encrypted digital video content.

30. The encoder according to claim 28, further comprising a transmitter for transmitting the selectively encrypted digital video content to a receiver.

31. The encoder according to claim 28, wherein the selection criterion comprises selection of all packets except those containing the SOF header.

32. The encoder according to claim 28, wherein the selection criterion comprises selection of certain packets except those containing the SOF header where the certain packets represent less than all of the packets that do not contain the SOF header.

* * * * *

UNITED STATES PATENT AND TRADEMARK OFFICE
CERTIFICATE OF CORRECTION

PATENT NO.         : 7,151,833 B2
APPLICATION NO.    : 10/391940
DATED              : December 19, 2006
INVENTOR(S)        : Candelore et al.

It is certified that error appears in the above-identified patent and that said Letters Patent is hereby corrected as shown below:

In col. 5, line 33, delete "oiler" and insert --other-- therefor.

In col. 5, line 41, delete "(STB)," insert -- (STB)), -- therefor.

In col. 8, line 23, delete "cement." and insert --content -- therefor.

In col. 9, line 11, delete "tat" and insert --that-- therefor.

Signed and Sealed this

Twenty-seventh Day of March, 2007

JON W. DUDAS
*Director of the United States Patent and Trademark Office*